United States Patent [19]

McGuire

[11] 4,257,388
[45] Mar. 24, 1981

[54] FOLDABLE BARBECUE

[76] Inventor: Danny C. McGuire, 7750 Muirfield Dr., Vancouver, British Columbia, Canada, V5S 2L7

[21] Appl. No.: 39,469

[22] Filed: May 16, 1979

[51] Int. Cl.³ .................... A47J 37/00; F24C 5/20
[52] U.S. Cl. .................... 126/26; 126/25 R; 126/38
[58] Field of Search .................... 108/152, 48, 38; 126/29, 30, 38, 9 B, 25 R, 59, 26

[56] References Cited

U.S. PATENT DOCUMENTS

| 1,187,664 | 6/1916 | Sichel | 126/29 |
|---|---|---|---|
| 1,273,840 | 7/1918 | Fassett | 126/29 |
| 1,732,782 | 10/1929 | Wasmuth | 108/38 |
| 2,249,845 | 7/1941 | Mitchell | 155/124 |
| 2,773,705 | 12/1956 | Hirak | 281/44 |
| 3,080,832 | 3/1963 | Schroemges | 108/13 |
| 3,088,127 | 5/1963 | Eames | 108/38 |
| 3,442,202 | 5/1969 | Ishida | 126/25 R |
| 3,481,267 | 12/1969 | Saiki | 126/25 R |
| 3,490,433 | 1/1970 | Busenbarrick | 126/9 |

*Primary Examiner*—Samuel Scott
*Assistant Examiner*—Wesley S. Ratliff, Jr.
*Attorney, Agent, or Firm*—Townsend and Townsend

[57] ABSTRACT

A barbecue mountable in a wall recess as a folded unit having a thickness less than the corresponding dimension of the wall. The barbecue includes a cooking assembly and a sliding hinge mechanism which attaches the assembly to the wall and allows the assembly to be unfolded and moved away from the wall to a position of use. A carrier frame of the cooking assembly supports a removable fuel pan and is fitted with folding parts which carry a detachable rack above the pan.

5 Claims, 7 Drawing Figures

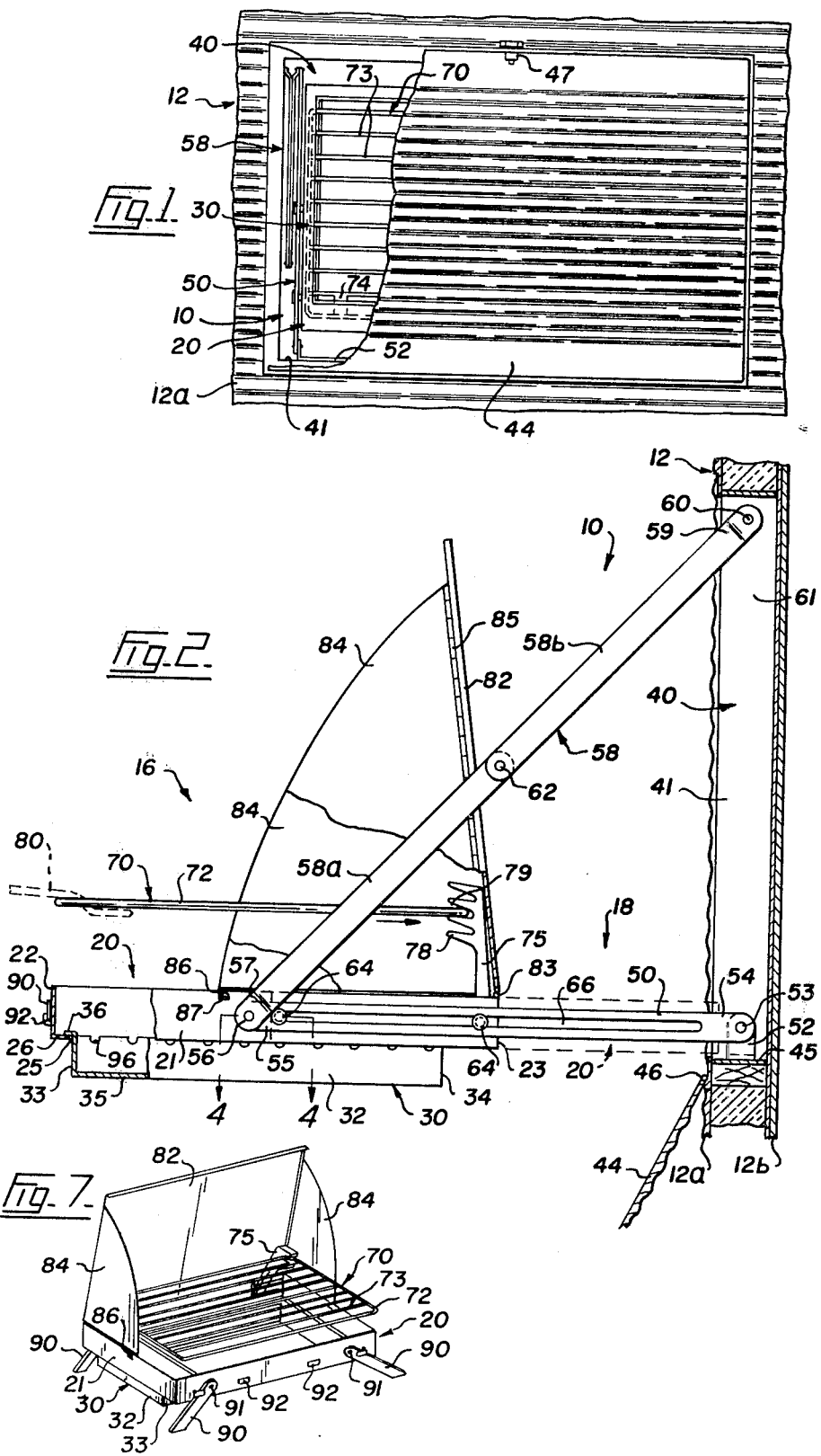

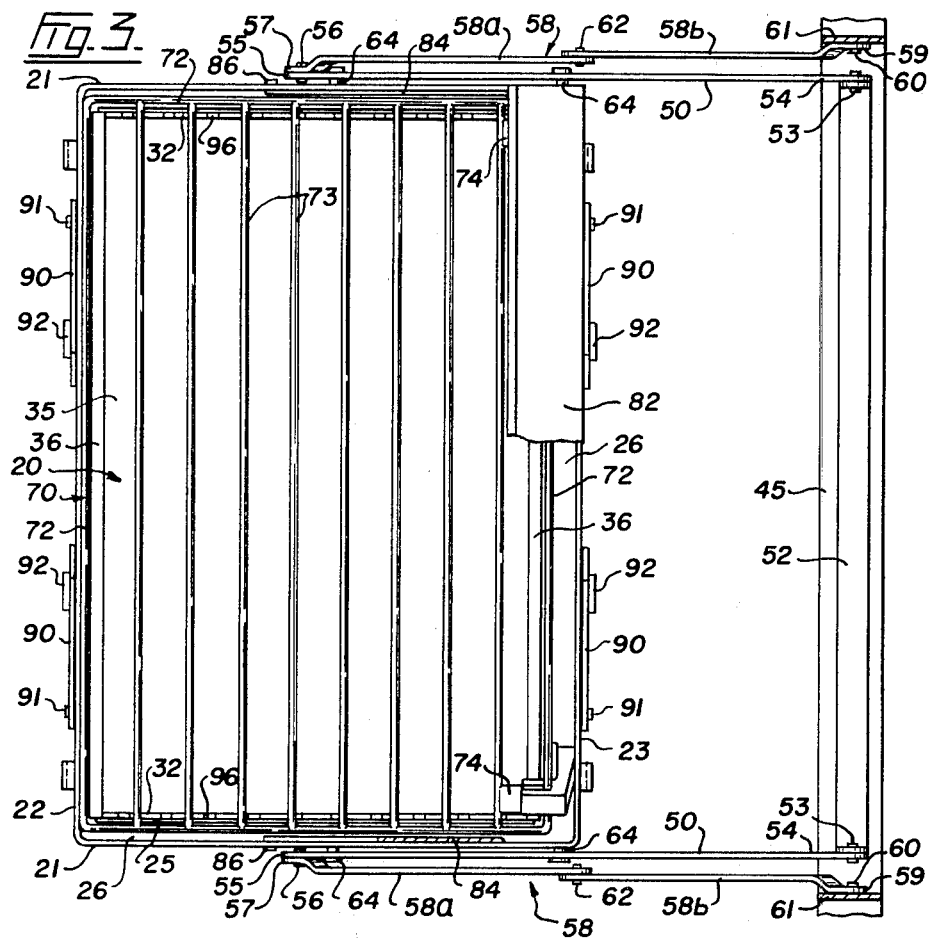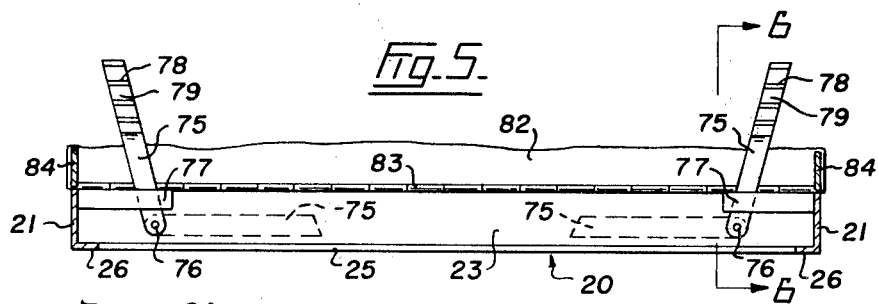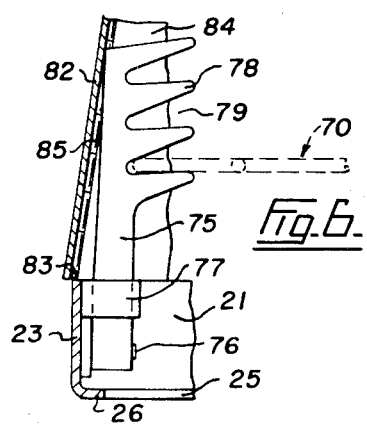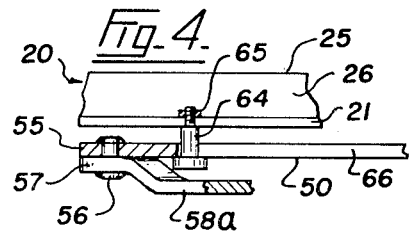

FOLDABLE BARBECUE

BACKGROUND OF THE INVENTION

This invention relates to a barbecue and more particularly to a folding barbecue adapted to be installed within a wall of a recreational vehicle.

A conventional barbecue takes up a considerable amount of space and therefor it is an awkward device to transport from place to place. The suggestion has been made to construct a barbecue so that it is foldable to some exent at least whereby to occupy a minimum amount of space when not in use. However, even relatively small storage spaces are at a premium in a vehicle such as a camper, a trailer, or a mobile home and the very size and construction of a conventional barbecue even if made foldable will often prevent it from being included as part of the equipment transported by such a vehicle.

SUMMARY OF THE INVENTION

The present invention solves the above mentioned storage problem by providing a barbecue which can be folded into a recess formed in an external wall of a trailer or the like. A hinge structure which attaches the barbecue to the wall allows the fire-containing parts of the device to be pulled a safe distance away from the wall when food is to be cooked. All the several parts which make up the cooking assembly of the barbecue can be collapsed and arranged relative to one another in such a way that the entire barbecue in the folded and stored position has a total thickness of less than the thickness of the trailer wall in which a recess is provided to receive the barbecue.

BRIEF DESCRIPTION OF THE DRAWINGS

FIG. 1 is a front elevation, partly broken away, showing the present barbecue folded into a position of storage, FIG. 2 is a side elevation, with some parts broken away and others in section, showing the barbecue unfolded to a position of use, FIG. 3 is a part sectional and part plan view of the unfolded barbecue, FIG. 4 is an enlarged detail section taken on the line 4—4 of FIG. 2, FIG. 5 is a vertical section showing portions of a cooking assembly of the barbecue mounted on a frame, FIG. 6 is a vertical section taken on the line 6—6 of FIG. 5, and FIG. 7 is a perspective view showing another arrangement of the barbecue.

DESCRIPTION OF THE PREFERRED EMBODIMENTS

Referring to the drawings, the numeral 10 indicates generally a foldable barbecue constructed in accordance with the present invention. The barbecue is shown in FIGS. 1 and 2 attached to a side wall 12 of a camper or other recreational vehicle. For this purpose, the present structure comprises a cooking assembly 16 which is attached to the wall 12 by mounting means 18.

The cooking assembly generally indicated at 16 is shown to comprise an open carrier frame 20. This rectangular frame has side members 21 connected by front and rear members 22 and 23. The four members making up the frame 20 are formed of angle iron to provide a bottom opening 25 which is bordered by horizontal flanges 26.

A pan 30 of the cooking assembly is supported by the carrier frame 20 and it is this pan which is filled with the charcoal briquets (not shown) or other material used to provide the heat for cooking. The fuel pan 30 has side walls 32 as well as front and rear walls 33 and 34. A bottom wall 35 extends between the side walls of the pan. The walls 33 and 34 of the pan have outwardly projecting flanges 36 which rest on the flanges 26 of the carrier frame. In this manner, the pan 30 is supported by the frame 20 projecting through the opening 26 as shown in FIG. 2.

The mounting means generally indicated at 18 is shown as comprising a housing 40 which is set into a recess 41 formed in the vehicle wall 12. Since the hollow insulated walls of most trailers and the like are only some two inches or so in thickness, the housing 40 is correspondingly thin so as to closely fit the recess as shown best in FIG. 2. In other words, the pan-like housing 40 is lodged in the recess and is suitably secured to the wall so as to occupy the space between inner and outer panels 12a and 12b of the wall. A door 44 is secured to a flanged bottom wall 45 of the housing by means of a hinge 46, the door preferably being formed of the same material as the outer panels 12b. Thus, when the door is closed and secured by means of a suitable latch 47 (FIG. 1), the door is flush with the panelling so that the presence of the barbecue on the camper wall is not readily apparent.

The mounting means 18 further includes a pair of support arms 50 which are spaced apart so that one arm extends alongside each side member 21 of the carrier frame. A substantially U-shaped bracket 52 is suitably secured to the bottom wall 45 of the housing and hinge pins 53 secure inner ends 54 of the support arms to this bracket. Outer ends 55 of the support arms are each connected by a pivot pin 56 to a lower end 57 of a diagonally-disposed brace 58. Each brace has an upper end 59 connected by another such pin 60 to a side member 61 of the housing. The diagonal braces 58 are each formed in two portions 58a and 58b of substantially equal length, the portions being interconnected by a hinge pin 62.

In FIGS. 2 and 4, it will be seen that each of the side members 21 of the carrier frame are fitted with laterally projecting slide bolts 64. These slide bolts are each secured to the side members by a nut 65 so to be readily removed from the carrier frame if necessary. The bolts 64 project through longitudinal slots 66 provided in the support arm 50. There are two such slide bolts suitably spaced apart on each side of the frame 20 so that the frame as well as the fuel pan 30 are properly supported by the arms 50 which in turn are supported by the braces 58. The sliding action resulting from this arrangement provides what will be referred to herein as a sliding hinge mechanism which allows the cooking assembly 16 to be moved towards and away from the wall 12.

The cooking assembly 16 further includes a rack 70 which is of a suitable design, that is, it has a rectangular wire frame 72 supporting parallel rods 73. As shown best in FIG. 1, the rear edge of the rack 70 is fitted with suitably spaced apart bars 74 which interconnect one of the rods 73 and the adjacent frame part. This rack is adapted to be secured to the carrier frame by means of a pair of posts 75 which are mounted on the rear member 23 of the frame as shown best in FIGS. 5 and 6. A pivot pin 76 attaches one end of each post to the member 23 so that the post is swingable between the solid and dotted line positions illustrated in FIG. 5. The frame member 23 is fitted with a U-shaped stop 77 for each post, the stop serving to support the post in the slightly laterally inclined position shown in FIG. 5. The upper ends of the post are provided with prongs 78 which are spaced apart by slots 79.

Thus, to attach the rack 70 to the carrier frame, the pair of posts 75 are swung into their inclined positions and so that the prongs 78 face forward or towards the frame member 22. The rack 70 is then held horizontally and the rear edge of the rack is pushed into horizontally aligned slots 79 on the two posts as far as it will go. The bars 74 on the rack are gripped between adjoining prongs 78 and the rack is held firmly enough to support an item such as a steak which must be grilled by the foldable barbecue. A detachable lifter 80 (FIG. 2) is provided to facilitate handling the rack 70 when it is hot. The carrier frame 20 is fitted with a lid 82 which is secured to the rear of the frame by a hinge 83. Guard plates 84 are secured to opposite side edges of the lid by other hinges 85 which allows the plates to be folded inwardly to parallelism with the lid. Connecting tabs 86 on the guard plates enter slots 87 formed in the side members 20 of the carrier frame when the lids and plates are in the erected position shown in FIG. 2.

Referring now to FIG. 7, the carrier frame 20 will be seen to be fitted with legs 90. These legs are located one near each corner of the rectangular carrier frame and are secured thereto by means of pivot pins 91. Spring clips 92 are provided on the carrier frame near each leg whereby the legs can be stored in their normal out-of-use position as shown in FIG. 2. Alternatively, the carrier frame and fuel pan can be detached from the remainder of the cooking assembly by removing the slide bolts 64 so that the barbecuing can be done on the ground or on a picnic table. The legs 90 are then released from their clips and are swung to the positions shown in FIG. 7 to support the cooking assembly a suitable distance above the ground or table.

When the present barbecue is attached to the vehicle wall 12 and is no longer required for cooking, rack 70 is disengaged from the posts 75 and the posts are folded into their horizontal positions alongside the rear member 23. The fuel pan 32 is then removed from the carrier frame and is emptied of its unburned contents. The rack can then be placed in the frame 20 nearer to the rear member 23 than to the front member 22. The pan 32 is inverted and is placed on top of the rack. It will be noticed that notches 96 are provided along the upper edges of the side walls 32 of the fuel pan. These notches 96 are spaced apart so as to fit over the rods 73 on the rack. This arrangement allows both the pan and the rack to be accommodated within the carrier frame and without the rack projecting above the side and end walls of the frame 20. The guard plates 84 are unhooked and are swung towards the lid 82 which can then be lowered to cover the carrier frame.

Now the cooking assembly 16 is ready to be stored within the recess 41 and this is done by first pushing the assembly inwardly to the dotted line position shown in FIG. 2. The braces 58 are folded inwardly and the assembly is swung upwardly into the housing 40. The door 44 is then closed and secured by means of the latch 47 so that all that can be seen is a door on the side of the recreational vehicle.

From the foregoing, it will be apparent the present invention provides a barbecue which is hidden in the relatively thin wall of a trailer or the like when the vehicle is underway or the device is not otherwise required. The barbecue can be quickly and easily unfolded so that it can be reassembled as required for cooking which is done with the unit pulled clear of the vehicle wall to prevent the heat and fumes from the charcoal fire from damaging the wall.

I claim:

1. A foldable barbecue comprising a housing mountable within a wall recess, a cooking assembly including a carrier frame and a pan for holding fuel, said carrier frame having side and end members defining a bottom opening, said fuel-containing pan being removably supported by the carrier frame to project through the bottom opening, a pair of support arms each having inner and outer ends and a longitudinal slot, hinge means securing the inner ends of the pair of support arms to the housing, a pair of hinged braces pivotally connecting the outer ends of the pair of support arms to the housing, slide bolts secured to the side members of the carrier frame and slidably projecting through the longitudinal slots of the pair of support arms, first and second posts mounted to the carrier frame for movement between a first position in which the posts are disposed within the carrier frame and a second position in which portions of the posts protrude above the carrier frame, a rack for supporting items to be cooked, and means defined by the posts and the rack for demountably connecting the rack to the posts when the posts are in the second position and positioning the rack above the carrier frame and the fuel pan, said rack and fuel-containing pan being of a size and shape to be accommodated stacked within the carrier frame when the cooking assembly is partially dismantled and reassembled for storage within the wall recess.

2. A foldable barbecue as claimed in claim 1, and including a lid hingedly secured to the carrier frame, a pair of side guards hingedly secured to opposite side edges of the lid and attachable to the carrier frame, and a door fitted to the wall to close the recess with the barbecue folded and stored within said recess.

3. A foldable barbecue as claimed in claim 1, and including a lid hingedly secured to the carrier frame, and a pair of side guards hingedly secured to opposite side edges of the lid and attachable to the carrier frame.

4. A barbecue adapted to be stored in a relatively shallow recess of a wall comprising: a carrier frame defined by upright frame members and a generally horizontally oriented ledge when the frame is in a generally horizontal position, the ledge defining a bottom opening, the frame members having a height no greater than a depth of the recess; a pan for holding a fuel sized to depend through the opening and having means for engaging the ledge and thereby supporting the pan on the frame; whereby the pan can be removed from the frame during storage thereof; a support arm having its first end pivotally secured to the wall and a second end for movement of the arm between a first position in which it is disposed within the recess and a second position in which the second end is outside the recess; means for attaching the carrier frame to a portion of the arm proximate the second end so that the carrier frame is in a generally horizontal orientation when the arm is in the second position and disposed within the recess when the arm is in its first position; a rack for holding a food item to be cooked; and post means movably attached to the carrier frame and configured to extend above the frame when the frame is in a generally horizontal orientation and to be retracted within the frame, the post means including means adapted to grip the rack when the post means extends above the frame and position the rack substantially parallel and spaced above the pan; whereby the barbecue can be stored upright in the recess by retracting the post means, removing the pan from the ledge, placing the rack over the ledge, and placing the pan in a position inverted from its fuel holding orientation over the ledge, so that the rack, the pan and the post means are substantially wholly disposed within the carrier frame, and by thereafter pivoting the arm into the first position to place the frame is in a substantially upright position within the recess.

5. A barbecue according to claim 4 wherein the rack has an outline selected so that the rack can be placed into the frame and onto the ledge during storage of the barbecue in the recess.

* * * * *